US012502324B2

(12) United States Patent
Spalek

(10) Patent No.: US 12,502,324 B2
(45) Date of Patent: Dec. 23, 2025

(54) VARIABLE-PRESSURE SUPPORT AND PATIENT BED, AND METHOD FOR OPERATION

(71) Applicant: Nocubi AG, Tägerwilen (CH)

(72) Inventor: Markus Spalek, Reutlingen (DE)

(73) Assignee: Nocubi AG, Tägerwilen (CH)

( * ) Notice: Subject to any disclaimer, the term of this patent is extended or adjusted under 35 U.S.C. 154(b) by 269 days.

(21) Appl. No.: 17/912,073

(22) PCT Filed: Mar. 8, 2021

(86) PCT No.: PCT/DE2021/100237
§ 371 (c)(1),
(2) Date: Sep. 16, 2022

(87) PCT Pub. No.: WO2021/185409
PCT Pub. Date: Sep. 23, 2021

(65) Prior Publication Data

US 2023/0135395 A1 May 4, 2023

(30) Foreign Application Priority Data

Mar. 16, 2020 (DE) ..................... 10 2020 107 182.5

(51) Int. Cl.
*A61G 7/057* (2006.01)
*A61G 7/018* (2006.01)

(52) U.S. Cl.
CPC ........... *A61G 7/0573* (2013.01); *A61G 7/018* (2013.01)

(58) Field of Classification Search
CPC ...... A61G 7/0573; A61G 7/018; A61G 7/057; A61G 7/005; A61G 2200/32; A61G 2203/10; A61G 2203/70; A61H 2015/0014; A61H 15/0079
See application file for complete search history.

(56) References Cited

U.S. PATENT DOCUMENTS 2,175,614 A * 10/1939 Redfield ............ A61H 15/0078 601/116
3,023,749 A * 3/1962 Baume ............... A61H 15/0078 601/126
3,128,761 A * 4/1964 Smith ................ A61H 15/0078 601/112
3,419,268 A * 12/1968 Bellet ................ A61H 15/0092 5/630

(Continued)

FOREIGN PATENT DOCUMENTS

CN 2300399 Y 12/1998
DE 3018828 A1 11/1981

(Continued)

*Primary Examiner* — Matthew Troutman
*Assistant Examiner* — Alison N Labarge
(74) *Attorney, Agent, or Firm* — Laurence A. Greenberg; Werner H. Stemer; Ralph E. Locher

(57) ABSTRACT

A variable-pressure support, a patient bed having such a variable-pressure support, and a method for operating such a variable-pressure support. A plurality of supporting elements is provided. A guiding arrangement is provided which has two guides arranged opposite one another in a transverse direction and extend in a longitudinal direction. The supporting elements are movably mounted at opposite ends in the guides.

13 Claims, 3 Drawing Sheets

(56) References Cited

U.S. PATENT DOCUMENTS

| | | | | |
|---|---|---|---|---|
| 4,165,737 | A * | 8/1979 | Chapa | A61H 15/0078 601/19 |
| 6,594,837 | B2 | 7/2003 | Khait | |
| 2010/0222724 | A1 * | 9/2010 | Huang | A61G 7/0573 5/607 |

FOREIGN PATENT DOCUMENTS

| | | | | |
|---|---|---|---|---|
| DE | 102005015305 | A1 * | 10/2006 | |
| DE | 102014212013 | B3 * | 4/2015 | A61G 7/057 |
| EP | 0266451 | A1 | 5/1988 | |
| EP | 2666451 | A1 * | 11/2013 | A61G 7/0573 |
| JP | 1991085162 | B2 | 4/1991 | |
| JP | 2001218362 | A | 8/2001 | |
| JP | 2005507267 | A | 3/2005 | |
| JP | 2014204943 | A * | 10/2014 | |
| WO | WO-2018137011 | A1 * | 8/2018 | A61G 7/005 |

* cited by examiner

VARIABLE-PRESSURE SUPPORT AND PATIENT BED, AND METHOD FOR OPERATION

FIELD AND BACKGROUND OF THE INVENTION

The present invention relates to a variable-pressure support, to a patient bed with a variable-pressure support of this type, and to a method for operating a variable-pressure support of this type.

In the case of home and/or professional care of bedridden patients, the problem of bedsores of the patients (what is known as decubitus) can occur. Here, local damage of the skin and the underlying tissue occurs on account of relatively long pressure loading which disrupts a blood flow through the skin.

In order to counteract this problem, what are known as decubitus mattresses (also called anti-decubitus mattresses) are known which are intended to achieve a reduction in the maximum supporting pressure, for example as a result of a greater support area for the patient or a supine position, in which the pressure distribution is more homogeneous. As an alternative or in addition, these mattresses can have a variable-pressure system, by way of which body locations can selectively be loaded and relieved, in order to avoid a long-term blood flow disruption. These variable-pressure systems as a rule comprise a plurality of air chambers which can be loaded with air in a targeted manner and/or in which the air pressure can be adapted.

SUMMARY OF THE INVENTION

It is an object of the present invention to specify an alternative to known anti-decubitus systems. It is an object of the invention, in particular, to further improve the decubitus prevention and/or the treatment of the symptoms, in particular to increase its effectiveness.

This object is achieved by way of a variable-pressure support and a patient bed with a variable-pressure support of this type, and a method for operating a variable-pressure support of this type in accordance with the independent claims.

A variable-pressure support, in particular for decubitus prevention, in accordance with a first aspect of the invention has a plurality of supporting elements which, in particular, are arranged behind one another along a longitudinal direction. According to the invention, the variable-pressure support additionally has a guide arrangement with two guides which are arranged so as to lie opposite one another in a transverse direction and run in the longitudinal direction. The supporting elements are mounted movably at opposite ends in the guides.

In the context of the invention, movable mounting is to be understood to mean, in particular, that the supporting elements can be moved along the longitudinal direction, that is to say in the longitudinal direction and/or counter to the longitudinal direction, in particular in a translational manner.

One aspect of the invention is based on the approach of providing a variable-pressure support with supporting elements which preferably define a bed surface of the variable-pressure support and can be moved with the aid of a guide arrangement consisting of two guides along a longitudinal direction, for example below a patient lying on the variable-pressure support. In other words, it can be provided that the supporting elements which preferably extend in a transverse direction can roll or slide away, for example, below the patient in the case of a movement relative to the patient. In this way, a continuous or at least intermittent change in the supporting pressure is made possible. Bedsores can thus be counteracted effectively and, in the case of decubitus which has already occurred, an increase in the symptoms can be prevented or at least slowed down.

Here, the supporting elements are preferably configured to support the patient. Each supporting element is preferably mounted movably at its two ends which lie opposite one another in the two guides which are arranged so as to lie opposite one another in a transverse direction which runs transversely with respect to the longitudinal direction. As a result, the weight of the patient can be absorbed by the guides. Here, the guides preferably run in the longitudinal direction, with the result that the supporting elements can be moved in and/or counter to the longitudinal direction.

During this movement of the supporting elements, the supporting points along the body of the patient can change substantially continuously or at least intermittently, in order for it to be possible to not only avoid or at least reduce blood flow disruptions, but also to promote the blood flow through the skin, in particular the vein function. In particular, blood vessels can even be flushed out. This blood flow promotion can also counteract thrombosis. In other words, the variable-pressure support additionally makes thrombosis prophylaxis and an improvement in lymphatic drainage possible.

The diameters of the supporting elements and the spacings of the individual supporting elements, in particular along the longitudinal direction, can fundamentally be selected relative to one another in a manner which is dependent on the patient size and/or the patient weight. These supporting element diameters and these supporting element spacings are preferably selected in such a way that comfortable support of the body weight is achieved, but at the same time enough skin area is relieved completely and therefore supplied with blood. These effects can be achieved, for example, with the aid of supporting element diameters which have a length in the longitudinal direction between 2 cm and 20 cm, preferably between 5 cm and 10 cm, in particular of approximately 6 cm, it being possible for the supporting element spacings to be between 5 cm and 45 cm, preferably between 10 cm and 25 cm, in particular approximately 15 cm.

As has already been indicated above, the variable-pressure support can be used as a “slatted frame”, in order to rest a patient at risk of decubitus thereon. It is also conceivable, however, for a correspondingly dimensioned variable-pressure support to be used as a seat pad or “seat cushion”, for instance on a wheelchair, armchair, car seat and/or the like. As an alternative or in addition, a variable-pressure support of this type can also be used, for example in the case of lengthy surgeries, as a leg support or as a pad for the entire body, for instance in order to ensure sufficient blood flow to the legs and/or other body parts.

In the following text, preferred embodiments of the invention and their developments will be described which, unless this is ruled out expressly, can be combined in each case in a desired manner with one another and with the aspects of the invention which are described in the further text.

In one preferred embodiment, the supporting elements in each case have a supporting roller which is mounted such that it can be rotated freely about a rotational axis which is oriented parallel to the transverse direction. Here, a free rotation of a supporting roller is to be understood to mean, in particular, that the supporting roller can rotate freely independently of another (for example, translational) movement, in particular a movement in and/or counter to the longitudinal direction. The freely rotatably mounted supporting rollers can rotate during the movement of the supporting elements below the patient supported by way of supporting rollers. In other words, the supporting rollers can roll, for example on the patient or on a supporting element cover, during the movement in and/or counter to the longitudinal direction. A substantially continuous or at least intermittent change in the supporting points along the body of the patient becomes possible as a result of this rolling movement. At the same time, the supporting elements can be moved below the patient with little force as a result of the rolling movement.

Here, the supporting roller diameter is preferably selected in a manner which is dependent on the patient size and/or the patient weight. The supporting roller diameter can lie, for example, between 2 cm and 20 cm, preferably between 5 cm and 10 cm, in particular at approximately 6 cm. As a result, comfortable support of the patient can be achieved, it being possible at the same time for a large body area to be relieved completely between two adjoining supporting rollers and therefore to be supplied with blood.

As an alternative, however, the supporting elements can also have in each case one sliding element which is configured to slide through below the patient. Here, the sliding elements preferably in each case have a sliding surface. At least the sliding surface can comprise a material with a low coefficient of friction, for example can be manufactured from Teflon. The variable-pressure support can thus be of simpler and more robust configuration in comparison with a variant with supporting rollers.

In a further preferred embodiment, each of the supporting elements has, at the opposite ends, in each case one running roller for movable mounting in the respective guide. Here, each running roller is preferably mounted such that it can be rotated freely, in particular with respect to the supporting roller, about a rotational axis which is oriented parallel to the transverse direction. In other words, the running rollers can be arranged in each case coaxially with the supporting rollers, but can rotate independently of them. It is conceivable, in particular, that the supporting elements in each case have an axle element which is configured as a seat for the supporting roller and/or two running rollers which are arranged, in particular, so as to lie on the outside. Here, the guides and running rollers are preferably configured in such a way that a running roller is supported by way of one of the guides and can roll in the guide, for example on a running surface. As a result, the friction which occurs during the movement of the supporting elements can be reduced considerably. In particular, the supporting elements can be mounted at least virtually without friction in the guides with the aid of the running rollers. As a result, a reduction in the power or force necessary for moving the supporting elements relative to the guides or the patient supported by way of the supporting rollers is possible.

As an alternative, however, the supporting elements can also be configured for sliding mounting in the two guides which are arranged so as to lie opposite one another. For this purpose, the supporting elements can have sliding portions at the two opposite ends thereof. The sliding portions preferably comprise a material with a low efficient of friction, for example Teflon. In comparison with the above-described variant with running rollers, the supporting elements can thus be manufactured more easily and are more robust and/or less susceptible to faults.

In order to make particularly reliable guidance of the supporting elements in the guides possible, the guides can enclose the running rollers or the sliding portions at least partially.

In particular, each of the two guides can be formed at least locally, in a channel-like manner and/or by way of a recess in a slat-like guide element which extends in the longitudinal direction, for example in order to at least decrease the risk of the supporting elements jumping out of the guides. As a result, the operational reliability can be increased further.

In a further preferred embodiment, in each case two adjoining (in particular, arranged adjacently) supporting elements are connected movably to one another (in particular, operatively connected and/or in a chain-like manner) at the two opposite ends by way of in each case one connecting element. In other words, in each case one connecting element can be provided in the regions at the two opposite ends of the supporting elements in order to connect two adjoining supporting elements. By way of the connecting elements, the supporting elements can be connected, in particular, in a chain-like manner or can form a chain. As a result, a (drive) force can be transmitted between the supporting elements, for example in order to move the supporting elements along the guides.

Here, the connecting elements are preferably arranged in each case between the supporting roller or the sliding element on one side and a running roller on the other side. The connecting elements can be plugged, for example, onto the axle elements. As a result, it can be avoided that the connecting elements impair a movement of the supporting elements in and/or counter to the longitudinal direction, for example as a result of entangling or wedging in the guides.

In a further preferred embodiment, in each case two adjoining supporting elements are connected elastically to one another. For this purpose, adjoining supporting elements can be connected to one another, for example, by way of spring connecting elements. In particular, the above-described connecting elements can be of elastic configuration, that is to say, for example, configured as spring connecting elements. An elastic connection of the supporting elements makes, for example, the compensating of changes in the length of the variable-pressure support or at least in the length of the running path of the supporting elements possible, for example during erecting of a head and/or foot part and/or in the case of sagging of the supporting elements on account of elastically configured or at least elastically mounted guides.

In a further preferred embodiment, the variable-pressure support has a preloading arrangement which is configured to preload the connections between the supporting elements or at least to maintain a preload between the supporting elements. For this purpose, the preloading arrangement can mount a first part of the guide arrangement, for example a driver wheel, such that it can be moved, in particular in the longitudinal direction, relative to another second part of the guide arrangement. In particular, the preloading arrangement can be configured to preload the movably mounted first part in or counter to the longitudinal direction relative to the second part of the guide arrangement, that is to say to press it away from the second part of the guide arrangement in or counter to the longitudinal direction. As a result, it is possible, for example, for particularly homogeneous spacing of the supporting elements in the longitudinal direction to be achieved.

Here, the preloading arrangement can have a cylinder which encloses a preloading means. The preloading means is preferably configured to press a preloading rod, mounted movably relative to the cylinder, out of the cylinder. The preloading means can be configured, for example, as a preloading element, in particular as a compression spring, which is under preload and is preferably preloaded between an end, arranged in the cylinder, of the preloading rod and a cylinder base. As an alternative, however, it is also conceivable that the preloading means is a pressurized gas which presses against the preloading rod which is then preferably of piston-like configuration.

The preloading rod is preferably coupled to at least one part of the supporting elements or the first part of the guide arrangement, in particular to a head or foot end of the variable-pressure support, in such a way that the preload which is generated by way of the preloading means can be transmitted to the connections between the supporting elements.

In a further preferred embodiment, each of the two guides has a plurality of guide elements, at least one part of which is arranged movably with respect to one another, in particular along the longitudinal direction. The guide elements of a guide can be connected movably to one another, for example, in particular in such a way that two adjoining guide elements can be tilted with respect to one another about a tilt axis parallel to the transverse direction. In other words, at least one part or portion of the two guides can be configured such that it can be warped or deformed, with the result that the supporting elements which are guided by the two guides arranged opposite one another can be deflected not only along the longitudinal direction, but rather at least slightly also perpendicularly with respect thereto, in particular perpendicularly with respect to the lying surface, defined by way of the supporting elements arranged behind one another along the longitudinal direction, of the variable-pressure support. As a result, the lying comfort can be increased. In particular, homogeneous pressure loading of the body of the patient can be achieved, as a result of which the risk of decubitus can be decreased further.

In a further preferred embodiment, at least one part of the guide elements of each of the two guides is connected to one another by way of in each case one running track. Each of the two running tracks is preferably configured as a belt which is, for example, 5 mm thick, and has a running surface, on which the running rollers of the supporting elements can roll. Running tracks of this type can impart a certain dimensional stability to the guide arrangement, and at the same time make a seamless movement of the supporting elements at the opposite ends thereof, in particular the running rollers, at the transition between two guide elements possible.

In order to further reduce the friction here during the movement of the supporting elements in and/or counter to the longitudinal direction, the running tracks can be configured from Teflon and/or can extend from a foot end of the variable-pressure support as far as a head end of the variable-pressure support.

In a further preferred embodiment, at least one part of the guide elements of each of the two guides is mounted elastically. For example, at least one part of the guide elements can be mounted in such a way that the supporting elements which are guided by the guides can be deflected perpendicularly with respect to the lying surface. As a result, the lying comfort for a patient can be increased further. In particular, homogeneous pressure loading of the patient body can be achieved.

In a further preferred embodiment, the guide arrangement has a plurality of spring elements which in each case support one of the guide elements. For this purpose, the variable-pressure support can have a carrying frame which is in particular rigid and preferably of frame-like configuration and carries at least one part of the guide arrangement, in particular the elastically mounted part of the guide elements of each of the two guides. Here, the spring elements are preferably arranged between the elastically mounted part of the guide elements and the carrying frame. As a result, a warping or deforming capability of the two guides which are arranged opposite one another can be achieved in a simple way.

It is conceivable here that the carrying frame is formed by way of a different part of the guide arrangement, in particular by way of the guides of rigid configuration of a return run. In other words, the spring elements can elastically mount the individual guide elements of a forward run against the return run.

In a further preferred embodiment, the spring elements in each case have a first fastening arrangement, and at least one part of the guide elements in each case has a second fastening arrangement. The spring elements are preferably fastened with the aid of the first and second fastening arrangements releasably without destruction, in particular without tools, at least to that part of the guide elements which in each case has a second fastening arrangement. As a result, the spring elements can be replaced if required, for example in the case of a defect or at least in the case of wear phenomena. It is also conceivable for spring elements with a stiffness which is tailored to the patient to be selected and therefore for the guide elements to be mounted elastically, in order to avoid excessive or insufficient deflection of the guide elements and therefore also of the supporting elements perpendicularly with respect to the lying surface.

Here, the first and second fastening arrangements are preferably configured in such a way that the spring elements can be fastened to the guide elements with the aid of a positively locking connection. For this purpose, the first and second fastening arrangements can be, in particular, of complementary configuration with respect to one another. The first fastening arrangements can have, for example, recesses or indentations, into which protrusions or bulges or projections of the second fastening arrangements can engage. As a result, individual or else all spring elements can be replaced easily.

In a further preferred embodiment, the guide arrangement has a forward run and a return run, with the result that the supporting elements can be moved in a circulating manner. In other words, one part of the supporting elements can therefore be moved with the aid of the forward run in the longitudinal direction, for example toward a head part of the variable-pressure support, whereas another part of the supporting elements can be moved with the aid of the return run counter to the longitudinal direction, for example toward a foot end of the variable-pressure support. The forward and return run make it possible, in particular, for the variable-pressure support to be operated continuously, without it being necessary for the movement direction of the supporting elements to be changed intermittently. In particular, the roller elements which support the patient can be moved through below the patient in the longitudinal direction without interruption, with the result that, for example, flushing of the blood vessels in the legs toward the torso is achieved. This can decrease the risk of thrombosis.

In a further preferred embodiment, the variable-pressure support has a flexible supporting element cover which is arranged, in particular stretched, above the supporting elements. The supporting element cover is preferably arranged in such a way that at least one part of the supporting rollers can roll on the supporting element cover in the case of a movement in and/or counter to the longitudinal direction. For this purpose, at least one part of the supporting element cover can be fastened, for example, to the guide arrangement, in particular to individual guide elements. The fastening is preferably non-releasable. It is also conceivable, however, for the fastening to be configured such that it can be released without tools, for example with the aid of press studs.

As an alternative or in addition to the fastening to the guide arrangement, however, it is also conceivable for a fastening of the supporting element cover to the carrying frame or to a frame of a patient bed which is configured for receiving the variable-pressure support, in particular the guide arrangement, to be provided. An increase in the lying comfort for the patient who is supported by way of the supporting rollers can be achieved by way of the supporting element cover. Moreover, however, the operational reliability can also be increased with the aid of the supporting element cover, since access to the movable supporting elements is prevented or is at least made more difficult.

The supporting element cover is preferably of watertight and/or dirt-repelling configuration at least in sections. The supporting element cover can have, for example, a tarpaulin-like plastic layer. As a result, the lying surface which is defined by way of the supporting element cover can be cleaned easily. A supporting element cover of this type therefore also makes it possible to comply with hygiene regulations.

In a further preferred embodiment, the supporting element cover is formed in multiple pieces from a flexible pad and a protective layer which is arranged between the flexible pad and the supporting elements. Here, the protective layer preferably lies on the supporting elements, that is to say the protective layer makes contact with the supporting rollers or sliding elements, it being possible for the protective layer to be of watertight and/or dirt-repelling configuration. The protective layer is preferably fastened non-releasably or releasably without tools to the guide arrangement, to the carrying frame or to the frame of the patient bed, in order for it to be possible, for example, for a penetration of liquids, objects and/or body parts into the region of the supporting elements or the guide arrangement to be prevented effectively and reliably.

In contrast, the flexible pad can be fastened to the guide arrangement, to the carrying frame or to the frame of the patient bed, possibly also to the protective layer, in a manner which is releasable without destruction, in particular without tools. As an alternative, it is also conceivable that the pad is not fastened at all, but rather merely lies loosely on the protective layer. As a result, the pad can be replaced, for example, without a great effort, for instance for hygiene reasons. The flexible pad can be configured, for example, as a thin mattress which is configured firstly to cushion the supporting rollers or sliding elements and/or secondly to absorb moisture, without canceling the pressure distribution which is achieved by way of the supporting elements.

In a further preferred embodiment, the guide arrangement has hinge elements which are arranged between a first portion of the guide arrangement and a second portion of the guide arrangement, and mount the guides in the first portion against the guides in the second portion such that they can be pivoted with respect to one another. As a result, the first portion of the guide arrangement can be capable of being erected with respect to the second portion. The hinge elements can delimit, for example, a head or foot part which can be erected. Firstly, the lungs of the patient can be relieved by way of the pivoting of the guides in the first portion against the guides in the second portion. Secondly, however, the care of the patient can also be facilitated as a result.

Here, the hinge elements are preferably configured to make pivoting of the guides in the first portion against the guides in the second portion by up to 40° possible.

In a further preferred embodiment, the variable-pressure support has a motorized drive device which is configured to move the supporting elements in and/or counter to the longitudinal direction. The motorized drive device can be configured, for example, as a motor, in particular an electric motor. As a result, an automatic, in particular continuous, movement of the supporting elements can be realized.

In a further preferred embodiment, the variable-pressure support has a manually actuable drive device which is configured to move the supporting elements in and/or counter to the longitudinal direction. Here, the variable-pressure support can have, in particular, a drive device which can both be operated by motor and actuated manually. The drive device can have, for example, a manual drive, for example in the form of a crank handle, or can be coupled thereto. This allows a movement of the supporting elements to be ensured even in emergencies, for example in the case of technical disruptions or a power failure, in order to maintain a varying pressure distribution in an uninterrupted manner.

In a further preferred embodiment, the guide arrangement has at least two driver wheels which are seated such that they cannot rotate on a drive axle which, in particular, is operatively connected to the drive device, which driver wheels are configured to drive the supporting elements in sections by way of a rotation of the axle. The driver wheels can be, for example, of gearwheel-like configuration and/or can have recesses or teeth, into which the supporting elements, in particular the supporting rollers or sliding elements and/or the running rollers, can engage. In the case of a rotation of the driver wheels, the supporting elements which are arranged in the recesses or teeth can be driven as a result. This movement can be transmitted, preferably via the connecting elements or elastic connections between adjoining supporting elements, to all the supporting elements as a translational movement. The movement of the supporting elements can therefore be achieved easily with the aid of driver wheels of this type.

Driver wheels and/or drive axles of this type are preferably arranged here at a head end and/or foot end of the variable-pressure support. The driver wheels can be arranged, in particular, between the forward run and the return run of the guide arrangement, and can be configured to transfer the supporting elements out of the guides of the forward run into the guides of the return run. This makes a reliable circulation of the supporting elements possible.

In a further preferred embodiment, the variable-pressure support has a control device which is configured to cause a movement of the supporting elements in at least two different operating modes, for example by way of corresponding actuation of the motorized drive device. In one operating mode, the supporting elements can thus, for example, be moved in circulation, whereas the supporting elements can be moved to and fro in a second operating mode. As an alternative or in addition, the supporting elements can be moved continuously in one operating mode, whereas the supporting elements are moved intermittently in another operating mode. As a result, the variable-pressure support can be used in a flexible manner, for example for patients with decubitus of different degrees or for patients with different degrees of immobility. In addition, this also makes an increase in the efficiency of the operation of the variable-pressure support possible, since energy can be saved in intermittent operation, for example, in the case of a patient with a lesser susceptibility to decubitus.

As an alternative or in addition, the control device can be configured to receive control commands from an external terminal device which is coupled to the control device. For example, an application, that is to say a software module, is conceivable which is configured such that it can be run on a smartphone or tablet, and is designed to make the control of the variable-pressure support, in particular of the motorized drive device, possible.

The control device and/or this application can also be configured for documentation of the operation of the variable-pressure support, in particular the operating modes and/or their sequence. As a result, an overview of the measures for preventing decubitus can be obtained at all times.

In a further preferred embodiment, the variable-pressure support has a control device which is configured to cause the emitting of an alarm signal, in particular independently of the power supply, if a motor-driven movement of the supporting elements is not possible. Here, an independence from the power supply is to be understood to mean, in particular, the suitability of the control device to maintain its functionality even in the case of an insufficient energy supply by way of a power supply system. For this purpose, the variable-pressure support, in particular the control device, can have an energy store, for example in the form of a battery. As a result, the operational reliability can be increased further, since maintenance of operation can be ensured as required, for example in the case of a power failure or in the case of a defect, for instance with the aid of the manually actuable drive device.

A patient bed, in particular for decubitus prevention, in accordance with a second aspect of the invention has a frame and a variable-pressure support in accordance with the first aspect of the invention which is supported by the frame.

Here, the variable-pressure support can be configured for connecting to the frame in a manner which is releasable without destruction, in particular without tools. For example, the variable-pressure support can have a latching or clip mechanism, with the aid of which the variable-pressure support can be fastened to the frame or can be hooked into the frame, in particular can latch or clip into said frame. As a result, the variable-pressure support can possibly also be used with conventional patient beds. In particular, conventional patient beds can be equipped or retrofitted with a variable-pressure support for decubitus prevention. At the same time, the variable-pressure support can also be removed again rapidly if required.

In the case of a method for operating a variable-pressure support, in particular for decubitus prevention, in accordance with a third aspect of the invention, a plurality of supporting elements which, in particular, are arranged behind one another along a longitudinal direction are moved in at least two guides of a guide arrangement which are arranged so as to lie opposite one another in a transverse direction, run in the longitudinal direction, and in which the supporting elements are mounted movably at opposite ends, in particular in and/or counter to the longitudinal direction.

Here, the movement of the supporting elements can take place with the aid of a motorized drive device and/or manually, for example with the aid of a manually actuable drive device. The control of the movement preferably takes place by way of a control device which can correspondingly actuate the motorized drive device. Different operating modes are conceivable, in particular, for example a circulating movement of the supporting elements, a to and fro movement of the supporting elements, a continuous movement of the supporting elements and/or an intermittent movement of the supporting elements.

The description up to now of preferred embodiments of the invention contains numerous features which are in part reproduced, combined severally, in the individual dependent claims. These features can, however, also be considered individually and can be combined to form appropriate further combinations. In particular, these features can be combined in each case individually and in any suitable combination with the variable-pressure support in accordance with the first aspect of the invention and the patient bed in accordance with the second aspect of the invention and the method in accordance with the third aspect of the invention.

The above-described properties, features and advantages of the invention and the way in which they are achieved will be explained in greater detail in conjunction with the figures in the following description of exemplary embodiments of the invention. The same designations are used for the same or corresponding elements of the invention throughout in the figures. For reasons of clarity, in the case of components which are present multiple times, only one is provided with a designation. The exemplary embodiments serve to explain the invention and do not restrict the invention to the combinations specified therein of features, not even in relation to functional features. Moreover, features of the exemplary embodiments which are suitable to this end can also be explicitly considered on their own and can be combined with any desired one of the claims.

DETAILED DESCRIPTION OF THE INVENTION

Figure 1:
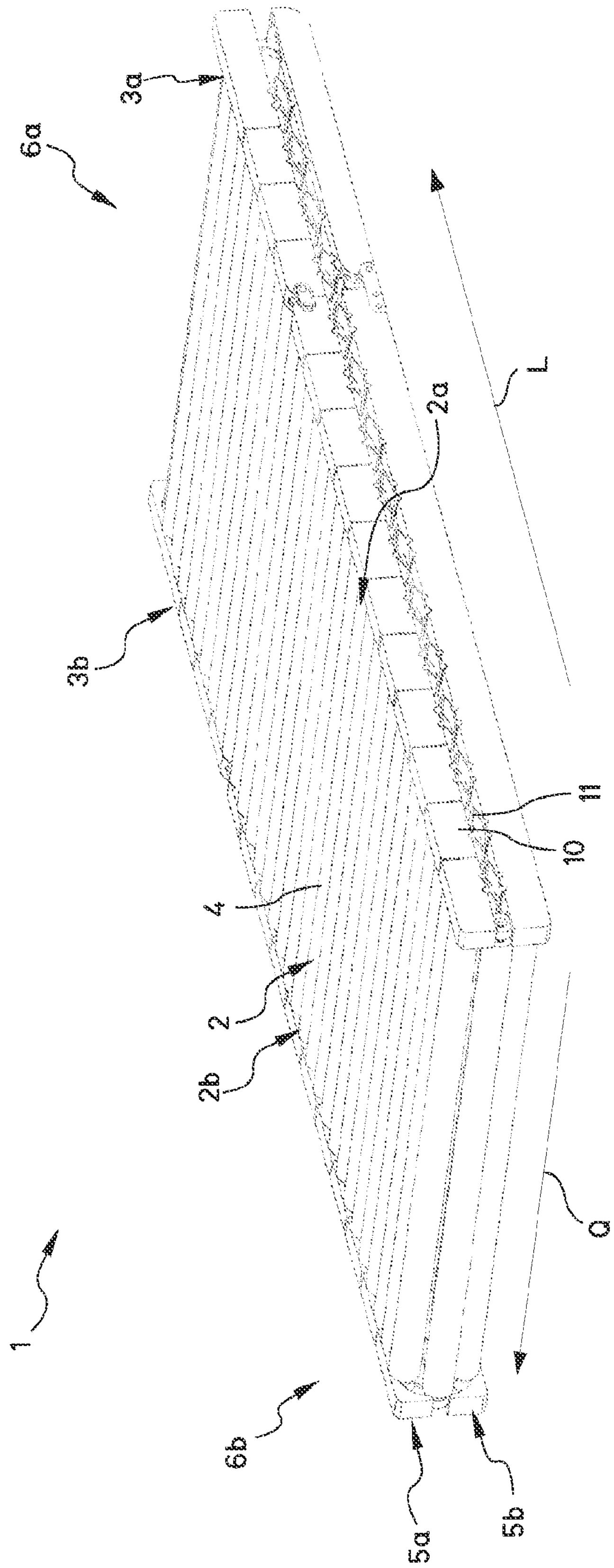
FIG. 1 shows one example of a variable-pressure support.

FIG. 1 shows one example of a variable-pressure support 1 for decubitus prevention with a plurality of supporting elements 2 which are arranged behind one another along a longitudinal direction L. The variable-pressure support 1 has a guide arrangement with two guides 3*a*, 3*b* which are arranged so as to lie opposite one another, the supporting elements 2 being mounted movably at the two opposite ends 2*a*, 2*b* thereof in the two guides 3*a*, 3*b*. In other words, the guides 3*a*, 3*b* and the supporting elements 2 are configured in such a way that the supporting elements 2 can be moved with the aid of the guides 3*a*, 3*b* in or counter to the longitudinal direction L.

In the example which is shown, each of the supporting elements 2 has a supporting roller 4 which is mounted such that it can be rotated freely about a rotational axis which is oriented transversely with respect to the longitudinal direction L, that is to say extends parallel to a transverse direction Q. The rotational axes of the supporting rollers 4 can be defined, for example, by way of the longitudinal axes of axle elements (not visible in FIG. 1), onto which the supporting rollers 4 can be plugged or pulled, for example.

It is also conceivable, however, to provide sliding elements (not shown) instead of the supporting rollers 4, which sliding elements are configured for sliding through below the patient. Sliding elements of this type can have, for example, a sliding surface and/or an oval cross section, in order to facilitate the sliding or at least to reduce the sliding friction.

As shown in FIG. 1, the variable-pressure support 1 forms a type of slatted frame, on which a patient who is susceptible to decubitus, for example is at least partially paralyzed or immobile in some other way, can be supported. On account of the movable mounting of the supporting elements 2, the "slats" of this frame are not arranged in a stationary or static manner, but rather are spatially variable or dynamic. This movability of the supporting elements 2 permits spatially changing pressure loading of the supported patient, by way of which pressure loading (long term) local blood flow disruptions and therefore local tissue damage up to and including necrosis can be effectively and reliably counteracted.

Unlike what is shown in FIG. 1, a variable-pressure support of this type can also be used in some other way, however, for example as a seat cushion or as a leg rest.

The supporting rollers 4 of the supporting elements 2 are configured in the embodiment shown in FIG. 1 to support the patient, the supporting elements 2 in turn being supported by the guide arrangement, for example by way of seating of the two ends 2*a*, 2*b* of each of the supporting elements 2 in the guides 3*a*, 3*b*. In the case of a movement of the supporting elements 2 in the longitudinal direction L, the supporting rollers 4 can roll beneath the patient on account of their free rotational mounting. In other words, the supporting rollers 4 achieve a situation where the supporting elements 2 can be moved relative to a patient who is supported by way of the supporting rollers 4. Here, the patient should remain in a stationary manner relative to the variable-pressure support 1 or relative to the guide arrangement.

For this purpose, a flexible supporting element cover (not shown) can be provided, by way of which the comfort of the patient and/or the operational reliability of the variable-pressure support 1 can be increased at the same time. Here, the supporting element cover is preferably stretched over the supporting rollers 4 and, for example, fastened to the guides 3*a*, 3*b*, with the result that the supporting rollers can roll on a side which faces the supporting rollers 4, that is to say the supporting element cover lower side. In addition to a penetration of objects or body parts into intermediate spaces between the supporting elements 2, the supporting element cover which is fixed in a stationary manner as a result can therefore also prevent the patient who is supported by the supporting rollers 2 and in the process lies on the supporting element cover also being moved in the case of a movement of the supporting elements 2.

In the example which is shown in FIG. 1, the guide arrangement has a forward run 5*a* and a return run 5*b*, the forward run 5*a* and the return run 5*b* being arranged above one another, that is to say in a stacked manner, as a result of which a slatted frame-like configuration of the variable-pressure support 1 is achieved. Other arrangements of the forward run and return run 5*a*, 5*b* relative to one another are fundamentally also conceivable, however.

Both the forward run 5*a* and the return run 5*b* have in each case two guides 3*a*, 3*b* which are arranged so as to lie opposite one another. With the aid of the forward and return run 5*a*, 5*b*, the supporting elements 2 can be moved in a circulating manner, that is to say on a closed path. For example, the supporting elements 2 can be moved with the aid of the forward run 5*a* in the longitudinal direction L, for instance from a foot part 6*b* of the variable-pressure support 1 to a head part 6*a* of the variable-pressure support 1, while the supporting elements 2 are conveyed back with the aid of the return run 5*b* counter to the longitudinal direction L from the head part 6*a* to the foot part 6*b*. As a result, for example, flushing of blood vessels in the legs of the patient toward his/her torso can be realized in the long term, for instance in order to decrease the risk of thrombosis.

Here, the guides 3*a*, 3*b* preferably have a plurality of guide elements 10 which are mounted in an elastic or resilient manner. For this purpose, the guide arrangement also has a plurality of spring elements 11 which support at least one part of the guide elements 10. Here, for example, as shown in FIG. 1, in each case one spring element 11 can elastically mount one of the guide elements 10. Adjacently arranged guide elements 10 are also mounted movably, at least slightly, relative to one another as a result of the elastic mounting of the guide elements 10.

With the aid of the spring elements 11, at least one part of the guide elements 10, in particular the forward run 5*a* or the guide elements 10 of the forward run 5*a*, can also be mounted movably with respect to another part of the guide elements 10, in particular the return run 5*b* or the guide elements 10 of the return run 5*b*. Here, the spring elements 11 can elastically connect or couple, in particular, the forward run 5*a* to the return run 5*b* which is preferably of rigid configuration and forms a carrier frame. The coupling between the forward and return run 5*a*, 5*b* makes particularly comfortable supporting of a patient on the variable-pressure support 1 possible.

Figure 2:
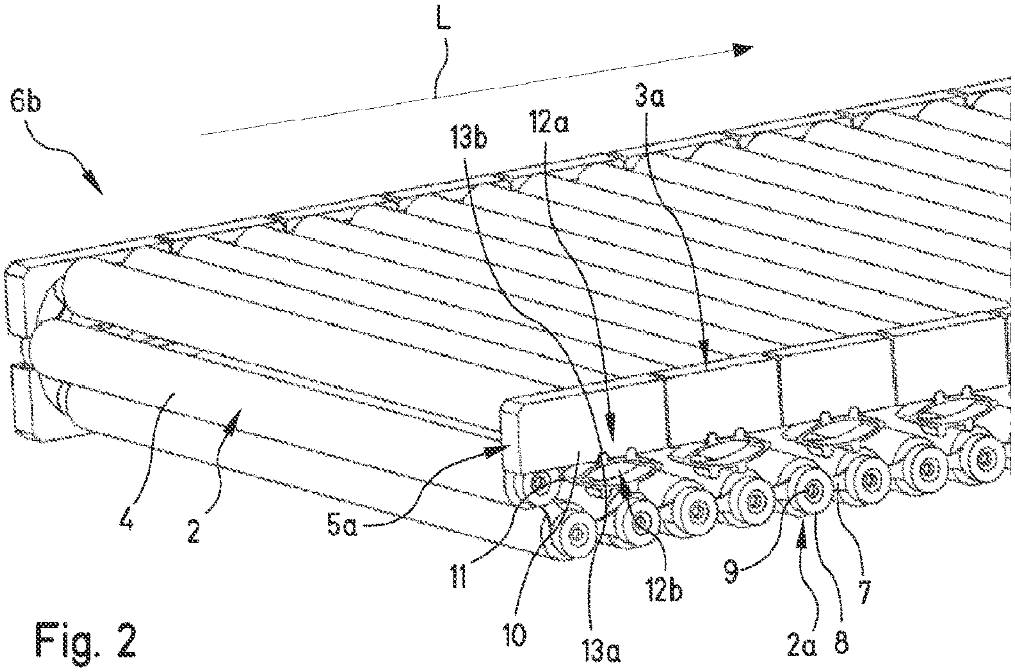
FIG. 2 shows a detail from FIG. 1 in the region of the foot part of the variable-pressure support without illustration of the return run.

FIG. 2 shows a detail from FIG. 1 in the region of the foot part 6*b* of the variable-pressure support without illustration of the return run. As a result, an (in particular, chain-like) connection of the supporting elements 2 by way of connecting elements 7 can be seen, which are arranged at the opposite ends (in FIG. 2, in each case only one end 2*a* of the two opposite ends is visible).

As a result, a chain of supporting elements 2 is formed which can be moved in the guide 3*a*.

Here, each of the connecting elements 7 is arranged between a supporting roller 4 and a running roller 8. Here, the connecting elements 7 and/or the running rollers 8, just like possibly also the supporting rollers 4, can be plugged or placed onto in each case one axle element 9, for example with an oversize fit.

With the aid of the running rollers 8, the supporting elements 2 are preferably mounted movably in the guide 3*a*. In order to make particularly secure guidance of the supporting elements 2 possible, the guide 3*a* here can have a channel-like recess or a groove for receiving the running rollers 8.

In one alternative embodiment, the supporting elements 2 have, instead of the running rollers 8, sliding portions (not shown) which are configured for sliding in the guides.

The supporting elements 2 are arranged movably relative to one another by way of the connecting elements 7. As a result, it is possible for the supporting elements 2 which are moved, for example, with the aid of the return run (not shown) counter to the longitudinal direction L to be deflected into the forward run 5*a* on the foot part 6*b* of the variable-pressure support.

As can be seen clearly in FIG. 2, at least one part of the guide elements 10 has in each case a first fastening arrangement 12*a*, and at least one part of the spring elements 11 has a second fastening arrangement 12*b*, with the aid of which the spring elements 11 can be fastened to the guide elements 10, in particular in a manner which is releasable without destruction and/or without tools. For this purpose, the first fastening arrangements 12*a* can in each case have at least one recess or indentation 13*a*, into which a corresponding (in particular, complementary) projection or bulge 13*b* of a second fastening arrangement 12*b* can engage.

Figure 3:
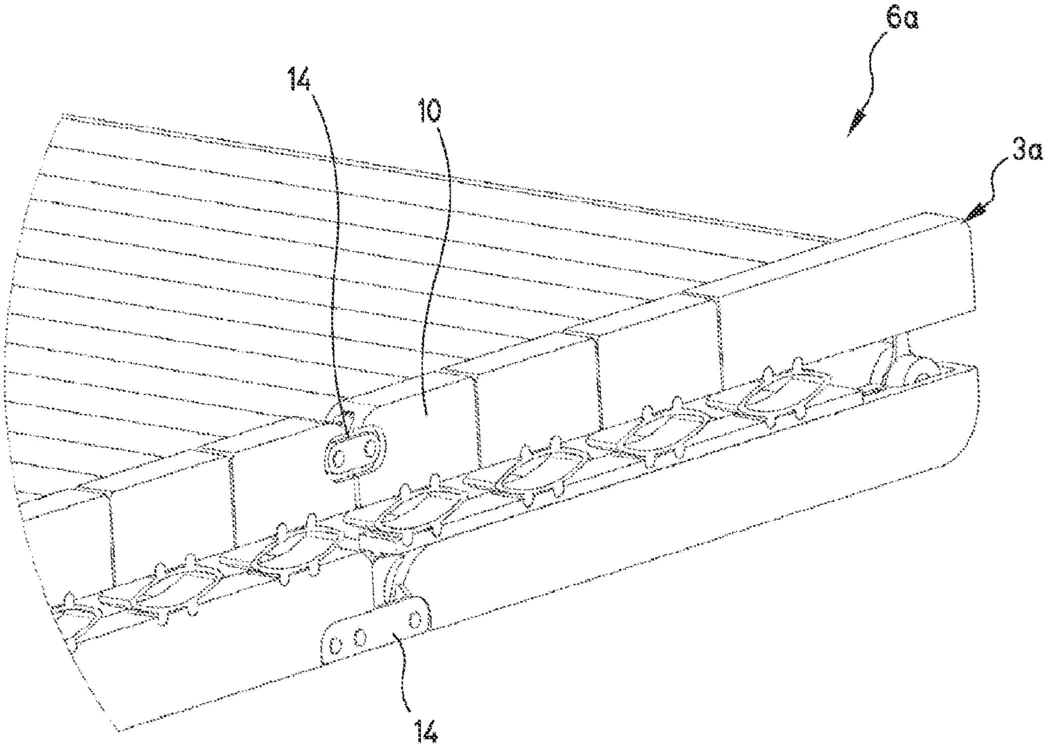
FIG. 3 shows a detail from FIG. 1 in the region of the head part of the variable-pressure support.

FIG. 3 shows a detail from FIG. 1 in the region of the head part 6*a* of the variable-pressure support. Here, the head part 6*a* is configured such that it can be erected. For this purpose, the guide arrangement has hinge elements 14, for example in each case at least one in each guide 3*a*. Here, each of the hinge elements 14 is preferably arranged between two adjoining guide elements 10 and is configured to make tilting of the two adjoining guide elements 10 with respect to one another possible. With the aid of hinge elements 14 of this type, the head part 6*a* can be erected, for example, by up to 40°.

Figure 4:
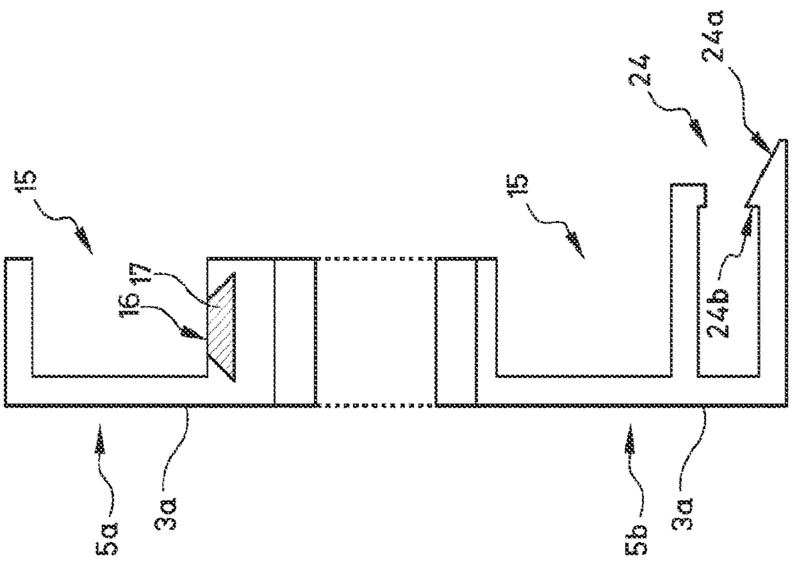
FIG. 4 shows one example of a part of a guide arrangement in a cross section.

FIG. 4 shows one example of a part of a guide arrangement in a cross section. The guide arrangement has a forward run 5*a* and a return run 5*b*, both the forward run 5*a* and the return run 5*b* comprising in each case one guide 3*a*, with the aid of which supporting elements (see FIGS. 1-3) of a variable-pressure support can be guided during a movement. Here, the forward run 5*a* is connected with the aid of spring elements 11 to the return run 5*b*. As a result, the guide 3*a* of the forward run 5*a* is mounted elastically, as are therefore also the supporting elements which are guided by it.

The guide 3*a* is configured to at least partially receive and mount movably in each case one end, in particular one running roller, of the supporting elements. For this purpose, the guide has a recess 15 or groove, into which one end, in particular one running roller, of a supporting element can engage.

In the example which is shown, a running surface 16 is provided in the recess 15 of the guide 3*a* of the forward run 5*a*, on which running surface 16, for example, the running rollers of the supporting elements can roll. Here, the running surface 16 is formed by a belt-like running track 17 which can connect a plurality of guide elements (cf. FIGS. 1-3) of the guide 3*a*. Here, the belt which forms the running track 17 is preferably inserted into the guide 3*a* in such a way that the running surface 16 is flush with a side surface of the recess 15. In order to reduce sliding friction or rolling friction during the movement of the supporting elements, the running track 17 can be manufactured from a low-friction material such as, for example, Teflon.

The guide arrangement which is shown is preferably configured for use with a patient bed, in particular a frame of the patient bed. For this purpose, the return run 5*b* has a latching or clip mechanism 24, with the aid of which the guide arrangement and therefore also the variable-pressure support can be fastened to or hooked into the patient bed or its frame. The variable-pressure support can thus also be released again from the patient bed or its frame without destruction and/or without tools, for instance by a pin 24*a* of the clip mechanism 24 being pressed down or bent in such a way that one or more barbs 24*b* of the pin 24*a* are released.

Figure 5:
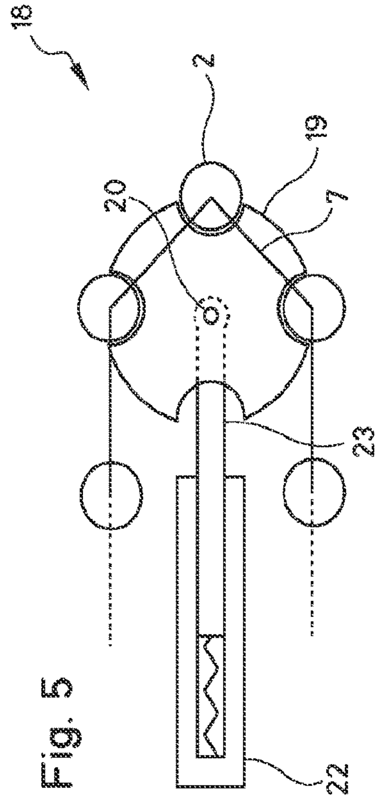
FIG. 5 shows one example of a preloading device.

FIG. 5 shows one example of a preloading arrangement 18 for preloading an (in particular, elastic) connection with the aid of connecting elements 7 between supporting elements 2 of a variable-pressure support. The preloading device 18 has a driver wheel 19 which is configured to drive the supporting elements 2 at least in sections during a rotation and is seated on a driver axle 20, and a preloading rod 21 which is mounted movably in a cylinder 22. The preloading rod 21 is connected to the driver axle at an end of the preloading rod 21, which end faces away from the cylinder 22.

The driver axle 20 can be mounted, for example, rotatably on or in the preloading rod 21, for example in an eye or an eyelet. In this case, the driver wheel 19 is seated on the driver axle 20 such that it cannot rotate. It is also conceivable here that the driver axle 20 is operatively connected to a drive device (not shown), with the result that the driver wheel 19 can be driven, for example, by motor and therefore the supporting elements 2 can be moved. Here, the driver axle 20 can also be called a drive axle.

As an alternative, the driver axle 20 can also be connected such that it cannot rotate to the preloading rod 21, however. In this case, the driver wheel 19 is mounted rotatably on the driver axle 20.

A preloading means 23 which is under preload is provided in the cylinder 22 which is arranged in a stationary manner relative to guides (cf. FIGS. 1-3) of a guide arrangement, in particular a carrier frame of the variable-pressure support, which preloading means 23 presses against an end of the preloading rod 21, which end lies in the cylinder 22. In the example which is shown, the preloading means 23 is configured as a spring element, in particular as a compression spring. The preloading means 23 can also be a pressurized gas, however.

The driver wheel 19 preferably forms a first part of the guide arrangement which is mounted such that it can be moved with respect to a second part of the guide arrangement with the aid of the preloading arrangement 18. Here, the second part of the guide arrangement can, for example, be formed by way of the guides of the guide arrangement.

Figure 6:
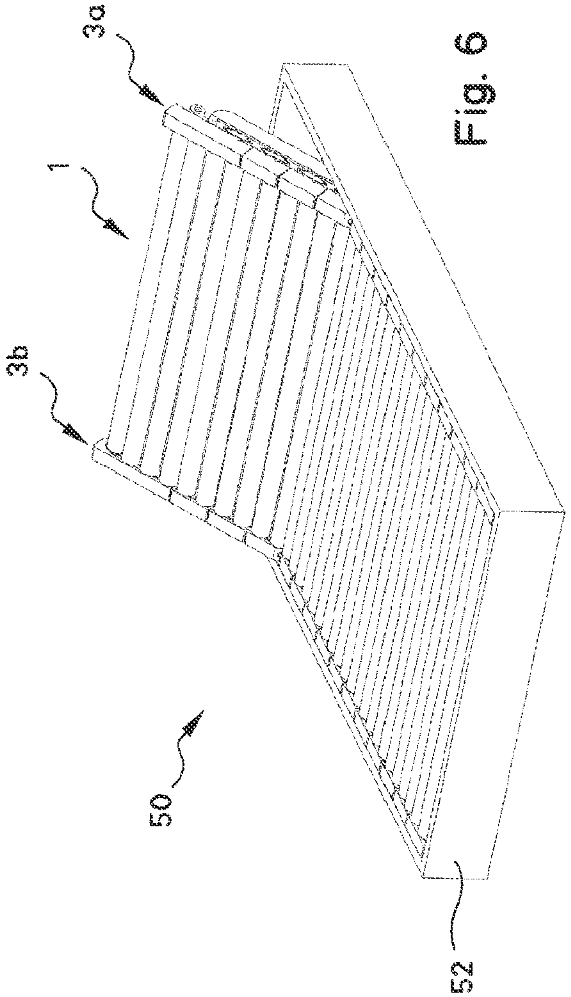
FIG. 6 shows one example of a patient bed.

FIG. 6 shows one example of a patient bed 50 which has a frame 51 and a variable-pressure support 1. The variable-pressure support 1 and the frame 51 are configured in such a way that the variable-pressure support 1, in particular a guide arrangement with two guides 3*a*, 3*b* which are arranged so as to lie opposite one another, is received at least partially by the frame 51. Here, the variable-pressure support 1 can have a latching or clip mechanism, with the aid of which the variable-pressure support 1 can be fastened to the frame 51 such that it can be released without destruction and/or without tools (cf. FIG. 4).

LIST OF DESIGNATIONS

1 Variable-pressure support
2 Supporting elements
2*a*, 2*b* End
3*a*, 3*b* Guide
4 Supporting roller
5*a*, 5*b* Forward run, return run
6*a*, 6*b* Head part, foot part
7 Connecting element
8 Running roller
9 Axle element
10 Guide element
11 Spring element
12*a*, 12*b* First, second fastening arrangement

13*a* Indentation
13*b* Bulge
14 Hinge element
15 Recess
16 Running surface
17 Running track
18 Preloading arrangement
19 Driver wheel
20 Driver axle
21 Preloading rod
22 Cylinder
23 Preloading means
24 Clip mechanism
24*a* Pin
24*b* Barb
50 Patient bed
51 Frame
L Longitudinal direction
Q Transverse direction

The invention claimed is:

1. A variable-pressure support, comprising:

a guide arrangement with at least two guides disposed to lie opposite one another in a transverse direction and extending in a longitudinal direction, each of said at least two guides having a plurality of guide elements, and at least some of said guide elements being arranged movably with respect to one another, and at least some of said guide elements of each of said at least two guides being mounted elastically with each of the elastically mounted guide elements being mounted by a spring arranged between the guide element and a fixed carrying frame; and a plurality of supporting elements mounted movably along said longitudinal direction at opposite ends in the plurality of guide elements of said at least two guides.

2. The variable-pressure support according to claim 1, wherein each of said supporting elements has a supporting roller mounted to freely rotate about a rotational axis that is oriented parallel to the transverse direction.

3. The variable-pressure support according to claim 1, wherein each of said supporting elements has, at each of said opposite ends, a running roller for movable mounting in a respective said guide, said running roller being mounted to be rotated freely about a rotational axis that is oriented parallel to the transverse direction.

4. The variable-pressure support according to claim 1, wherein each of two mutually adjoining supporting elements are movably connected to one another at said two opposite ends by way of a respective connecting element.

5. The variable-pressure support according to claim 4, further comprising a preloading arrangement configured to preload the connections between said supporting elements.

6. The variable-pressure support according to claim 1, wherein said spring elements having a first fastening arrangement, and at least some of said guide elements having a second fastening arrangement, with the aid of which said spring elements are releasably fastened non-destructively to that part of said guide elements that have said second fastening arrangement.

7. The variable-pressure support according to claim 1, wherein said guide arrangement has a forward run and a return run configured to enable said supporting elements to be moved circularly.

8. The variable-pressure support according to claim 1, further comprising a flexible supporting roller cover arranged above said supporting elements, said supporting roller cover being formed in multiple pieces from a flexible pad and a protective layer which is arranged between said flexible pad and said supporting elements.

9. The variable-pressure support according to claim 1, further comprising a motorized drive device configured for manual activation and configured to move said supporting elements in the longitudinal direction.

10. The variable-pressure support according to claim 1, further comprising a control device configured to cause a movement of said supporting elements in at least two different operating modes.

11. The variable-pressure support according to claim 1, comprising a control device configured to cause an alarm signal to be emitted if a motor-driven movement of said supporting elements is not possible.

12. A patient bed, comprising a frame and a variable-pressure support according to claim 1 supported by said frame.

13. A method of operating a variable-pressure support, the method comprising:

providing a variable-pressure support with a guide arrangement with at least two guides disposed to lie opposite one another in a transverse direction and extending in a longitudinal direction, each of said at least two guides having a plurality of guide elements, and at least some of said guide elements being arranged movably with respect to one another, and at least some of said guide elements of each of said at least two guides being mounted elastically with each of the elastically mounted guide elements being mounted by a spring arranged between the guide element and a fixed carrying frame, and a plurality of supporting elements mounted movably along said longitudinal direction at opposite ends in the plurality of guide elements of said at least two guides; and moving the supporting elements along the guides of the guide arrangement.

* * * * *